(12) United States Patent
Damen et al.

(10) Patent No.: US 12,514,740 B2
(45) Date of Patent: Jan. 6, 2026

(54) MANDIBULAR ADVANCEMENT DEVICE WITH SPACED APART SETS OF ELECTRICAL COMPONENTS

(71) Applicant: NIGHTBALANCE B.V., Eindhoven (NL)

(72) Inventors: Teddy Damen, Eindhoven (NL); Thijs Van Oorschot, Eindhoven (NL); Eline Christiane Van Beest, Eindhoven (NL)

(73) Assignee: NIGHTBALANCE B.V., Eindhoven (NL)

( * ) Notice: Subject to any disclaimer, the term of this patent is extended or adjusted under 35 U.S.C. 154(b) by 1311 days.

(21) Appl. No.: 17/043,143

(22) PCT Filed: Mar. 27, 2019

(86) PCT No.: PCT/EP2019/057654
§ 371 (c)(1),
(2) Date: Sep. 29, 2020

(87) PCT Pub. No.: WO2019/185671
PCT Pub. Date: Oct. 3, 2019

(65) Prior Publication Data
US 2021/0022913 A1    Jan. 28, 2021

(30) Foreign Application Priority Data
Mar. 30, 2018   (NL) ..................... 2020696

(51) Int. Cl.
*A61F 5/56* (2006.01)
*A61B 5/00* (2006.01)
*A61B 5/1455* (2006.01)

(52) U.S. Cl.
CPC .......... *A61F 5/566* (2013.01); *A61B 5/14552* (2013.01); *A61B 5/4818* (2013.01); *A61B 5/682* (2013.01);

(Continued)

(58) Field of Classification Search
CPC ..... A61B 5/1072; A61B 5/1076; A61B 5/481; A61B 5/4812; A61B 5/4818;
(Continued)

(56) References Cited

U.S. PATENT DOCUMENTS 6,089,864 A  *  7/2000  Buckner .................... A61F 5/56
                                                                        433/68
2010/0274313 A1 * 10/2010 Boling ............... A61N 1/37217
                                                                        607/116

(Continued)

FOREIGN PATENT DOCUMENTS

| EP | 2543027 B1 | 8/2016 | |
| WO | 2014110548 A1 | 7/2014 | |
| WO | WO-2019108946 A1 * | 6/2019 | ........... A63B 71/085 |

OTHER PUBLICATIONS

International Search Report and Written Opinion of PCT/EP2019/057654, dated Jun. 26, 2019.

*Primary Examiner* — Ophelia A Hawthorne
*Assistant Examiner* — Michael Milo

(57) ABSTRACT

A mandibular advancement device to adjust a lower jaw in an advanced position with respect to an upper jaw of a user includes a maxillary splint with a first and second splint body end portion and a splint bridge portion and further a mandibular splint which is coupled to the maxillary splint by a positioning structure. The device also incldues an electronics module which is subdivided into a first set of electronic components which is positioned at the first splint body end portion and a second set of electronic components which is positioned at the second splint body end portion. The spaced sets at both ends of the maxillary splint are electronically interconnected to form the electronics module. Herewith, the device has a smooth and compact configuration which is convenient to wear for several hours during a sleep therapy.

10 Claims, 2 Drawing Sheets

(52) U.S. Cl.
CPC ....... *A61B 5/746* (2013.01); *A61B 2560/0214* (2013.01); *A61B 2560/0219* (2013.01)

(58) Field of Classification Search
CPC ... A61B 5/4557; A61B 5/14552; A61B 5/682; A61B 5/746; A61B 5/097; A61B 17/8071; A61B 2560/0214; A61B 2560/0219; A63B 2071/086; A63B 71/085; A61F 2002/30991; A61F 2/2803; A61F 5/56; A61F 5/566; A61F 2005/563; A61C 19/045; A61C 11/00; A61C 7/08; A61C 7/36; A61C 9/0006; Y10S 602/902
USPC ........................................................ 128/848
See application file for complete search history.

(56) References Cited

U.S. PATENT DOCUMENTS

| | | | | |
|---|---|---|---|---|
| 2012/0240941 | A1* | 9/2012 | Rosenman | A61F 5/566 |
| | | | | 128/848 |
| 2015/0190630 | A1* | 7/2015 | Kent | A61F 5/56 |
| | | | | 128/848 |
| 2015/0250642 | A1* | 9/2015 | Miquel | A61C 7/36 |
| | | | | 128/848 |
| 2015/0305671 | A1* | 10/2015 | Yoon | A61B 5/01 |
| | | | | 600/28 |
| 2017/0290699 | A1* | 10/2017 | Radmand | A61B 5/4557 |
| 2018/0368961 | A1* | 12/2018 | Shanjani | A61B 5/4547 |
| 2019/0223751 | A1* | 7/2019 | Weinstein | A61B 5/4277 |

* cited by examiner

MANDIBULAR ADVANCEMENT DEVICE WITH SPACED APART SETS OF ELECTRICAL COMPONENTS

CROSS-REFERENCE TO PRIOR APPLICATIONS

This application is the U.S. National Phase application under 35 U.S.C. § 371 of International Application Serial No. PCT/EP2019/057654, filed on Mar. 27, 2019, which claims the benefit of Netherlands Application Serial No. 2020696, filed on Mar. 30, 2018. These applications are hereby incorporated by reference herein.

The present invention relates to a mandibular advancement device. These devices are also known as mandibular advancement splints, sleep apnea oral appliances, oral airway dilators and sleep apnea mouth guards. A mandibular advancement device is a commonly known type of mouthpiece for setting a lower jaw of a person in an advanced position with respect to an upper jaw of the person.

Such a mandibular advancement device is used in the field of treating respiration related sleep disorders, in particular in the field of treating sleep apnea. While sleeping, muscles in the tongue and a soft palate may relax and lose their tone. Loss of muscle tone in the tongue and soft palate can result in a closure or narrowing of the pharyngeal airway which in turn can cause snoring and, in the case of complete closure of the airway, a sleep apnea. Sleep apnea is associated with repetitive drops in blood oxygen saturation and/or arousal of the brain which results in a health risk. Obstructive sleep apnea may further lead to cardiovascular complications and can also have adverse effects on cognition and memory. Further, obstructive sleep apnea may cause daytime sleepiness and fatigue.

Several treatments to reduce sleep respiratory disorders are known, like positive airway pressure therapy CPAP, surgical interventions or using an oral appliance to maintain airway patency. A treatment is known as sleep position therapy. Sleep position therapy is intended to avoid sleeping in undesired postures, in particular sleeping in a supine posture and is intended to stimulate sleeping in a prone, left or right side posture.

EP2.543.027B1 is a granted European patent in the name of the same applicant which discloses an oral appliance to be worn in an oral cavity of an individual. The oral appliance is configured to carry out a treatment in which a tongue and/or lower jaw is set in an advanced position with respect to an upper jaw. The oral appliance comprises a position sensing component which is integrated in the oral appliance for measuring an orientation of a head of the individual. Herewith, the position sensing component measures a sleep position of the individual. A corrective action component is provided to generate an alert to influence or alter an individual's sleep position.

WO2012/129397 discloses a patient position monitor including an oral appliance, in particular a mandibular advancement device, for monitoring a sleep posture of a patient in treatment of sleep apnea and snoring. The oral appliance is configured for placement within the patient's oral cavity. The oral appliance in use is secured within the cavity to maintain a constant orientation relative to the patient's head. The oral appliance is irremovably secured over a tooth or group of teeth. The position of the head is tracked and serves as a direct measure of the likelihood of an occurrence of snoring and sleep apnea.

The oral appliance of WO2012/129397 comprises an electronics module which is capable of determining the orientation of the patient position monitor and of providing an alarm when the monitor is in a certain pre-determined orientation. The electronics module comprises a circuitry for both orientation monitoring/determination and for generating an alarm when the orientation is within predetermined limits.

The electronics module is adapted for placement on the oral appliance and will usually be hermetically sealed to be impervious to salvia in the oral environment for extended periods of time. The circuitry of the electronics module may be a flex circuit to be embedded in the oral appliance or may be placed inside a housing. The housing is mounted to a tooth guard formed from vacuum/moulded polycarbonate.

The circuitry comprises a position sensor formed by an accelerometer to determine an orientation of the housing. Further, the circuitry comprises a button, a LED, a microprocessor, a battery, an inductive charging component, a wireless input-output component and a vibrator for generating an alarm. The alarm is typically a vibrational alarm which may be transmitted to the cochlea via bone conduction.

A problem related to this known mandibular advancement device is that the device is too bulky. The device is inconvenient to wear inside a person's oral cavity for a sleep period lasting several hours.

The general object of the present invention is to at least partially eliminate the above mentioned drawbacks and/or to provide a usable alternative. More specific, it is an object of the invention to provide a mandibular advancement device which is more comfortable for wearing during a sleep period.

According to the invention, this object is achieved by a mandibular advancement device according to claim 1.

The mandibular advancement device is configured to be placed in a user's oral cavity. In a sleep position therapy, the mandibular advancement device is to be worn during a sleep period for several hours.

The mandibular advancement device comprises a maxillary splint. The maxillary splint is adapted to be fitted on a maxillary row of teeth. In particular, the maxillary splint is adapted to fit tightly on at least one molar, such that the maxillary splint is fastened to an upper jaw of the user.

The maxillary splint has a tooth engagement surface to engage tightly with at least one tooth. In particular, the tooth engagement surface is adapted to fit tightly with the at least one molar at an upper jaw of the user. Preferably, the tooth engagement surface is provided by a molar receiving pocket which is complementary shaped to the at least one molar of the user.

The maxillary splint comprises a U-shaped maxillary splint body. The U-shaped maxillary splint body has a first splint body end portion which forms a first U-leg. In particular, the first splint body end portion comprises a molar receiving pocket which engages tightly to at least one molar. The U-shaped maxillary splint body has a second splint body end portion which forms a second U-leg. In particular, the second splint body end portion comprises a molar receiving pocket which engages tightly to at least one molar. More in particular, the first splint body end portion engages in use tightly to left upper molars of a user wearing the mandibular advancement device, while the second splint body end portion in use engages tightly to right upper molars of a user wearing the mandibular advancement device.

A splint bridge portion extends in between the first and second splint body end portions. Preferably, seen in use, the splint bridge portion extends in between corner teeth and engages with a row of front teeth of the user.

The mandibular advancement device further comprises a mandibular splint. The mandibular splint is adapted to fit at least partially on a mandibular row of teeth of the user. Preferably, the mandibular splint comprises a molar receiving pocket which is complementary shaped to a specific shape of at least one molar of an individual wearing the mandibular advancement device.

The mandibular advancement device comprises a positioning structure for positioning the mandibular splint in an anterior direction with respect to the maxillary splint, such that in use a lower jaw is placeable in a forward direction with respect to an upper jaw. The positioning structure is arranged for positioning the mandibular splint in an advanced position with respect to the maxillary splint. The advanced position is advanced relative to a natural position of the lower and upper jaw of the user. By placing the lower jaw forward of the upper jaw, a throat of a user is to be maintained open, and an apnea may be prevented.

Further, the modular advancement device comprises an electronics module. The electronics module comprises a first and second set of electronic components. Each set of electronic components comprises at least one electronic component, like a sensor, microprocessor, battery etc.

According to the invention, the first and second set of electronic components are spaced apart from each other. The first and second set of electronic components are located at separate positions of the maxillary splint. The first set of electronic components is positioned at the first splint body end portion of the U-shaped maxillary splint, while the second set of electronic components is positioned at the second splint body end portion of the U-shaped maxillary splint. The first and second set of electronic components are electronically interconnected. Data and/or signals are transferable in between the first and second set of electronic components.

The mandibular advancement device according to the invention may provide various benefits.

A main advantage is that the distribution of electronic components may strongly reduce a bulkiness of the maxillary splint. Instead of a single bulky unit containing all electronic components, the sets of electronic components are positioned at different and separate positions at the maxillary splint, such that the sets of electronic components are spaced apart from each other. Instead of providing a mandibular advancement device with a molar-fitting end portion at one side and a bulky storage compartment at an opposite side of this same molar fitting end portion, according to the invention, the electronic components are divided over separate sets which are spaced apart and distributed across the maxillary splint. This distribution provides a more smoothened maxillary splint. This increases a comfort of use.

The electronic components are positioned at the first and second splint body end portions which is optimally convenient for a user. When wearing the device, the first and second set of electronic components become situated in the oral cavity at a location which from its nature provides some space.

The sets of electronic components are positioned at the maxillary splint which is beneficial in a sleep position therapy. In the sleep position therapy, the user is alerted by a stimulus provided by an alert unit. The alert unit is one of the electronic components. By positioning the alert unit at the maxillary splint, a molar of the upper jaw or the upper jaw itself can be stimulated by a vibration. The vibration is to be observed by the user to stimulate the user to change to another sleep position. A positioning of the alert unit at the maxillary splint is advantageous, because it has appeared that a user has a better response to a stimulus provided to the upper jaw than a stimulus to the lower jaw.

The first and second set of electronic components are preferably positioned at an outer side of the first and second body end portions of the maxillary splint which corresponds in use with a position opposite an inner surface of the left and right cheeks. By such a placement of the set of electronic components, the set of electronic components are positioned at the location in the oral cavity which provides sufficient space. This situation of the first and second set of electronic components in the oral cavity is relative to other locations less disturbing for a user. The cheek is a relatively flexible skin portion. Hence, even when the mandibular advancement device might be somewhat thicker at that part of the splint, this will still be acceptable for a user.

In an embodiment of the mandibular advancement device according to the invention, the first and second set of electronic components may be wirelessly interconnected, wherein each set of electronic components comprises its own power source. Preferably, the first and second set of electronic components are interconnected by an electronic conduit. Advantageously, a single power source may operate both the first and second set of electronic components. Preferably, a flexible printed circuit board (PCB) which comprises the electronic conduit is provided to interconnect the first and second set of electronic components.

Preferably, the electronic conduit extends along the splint bridge portion to electronically connect the first set of electronic components and the second set of electronic components with each other. The electronic conduit may extend along an outer surface of the splint bridge portion, but preferably the electronic conduit is embedded inside the splint bridge portion. The embedded electronic conduit is in a protected position and less vulnerable to be damaged or contaminated. The splint bridge portion may include a passageway, at the interior of the splint bridge portion, in which passageway the electronic conduit can be installed during manufacturing of the mandibular advancement device. After placement of the electronic conduit and a closure of the passageway, the electronic conduit is embedded in the splint bridge portion.

In an embodiment of the mandibular advancement device, the first set of electronic components comprises a first cover for covering the first set of electronic components. The first cover shields the set of electronic components, e.g. from getting damaged or from moisture, bacteria and contaminations which are present in the oral cavity. The first cover is preferably hermetically sealed with the first splint body end portion. Advantageously, the cover, also called first cover, hermetically seals the set of electronic components from the environment to prevent damages and contaminations.

In an embodiment of the mandibular advancement device according to the invention, the maxillary splint body may comprise a compartment at any of the first and second splint body end portions for receiving a set of electronic components. The compartment is configured for receiving one of the first and second set of electronic components. The set of electronic component may be installed in the compartment as an electronic unit. In a further embodiment, the electronic conduit may extend in between a first and second compartment, e.g. via the passageway formed in the splint bridge portion, for electronically interconnecting the first and second set of electronic components.

In particular, the compartment may have a compartment bottom and a compartment wall. Preferably, the compartment is open in a sidewards direction of the maxillary splint for laterally receiving a set of electronic components. The cover of the set of electronic components preferably seals a compartment of the splint body end portion, including the electronic component received therein. Preferably, the cover is configured to hermetically seal a compartment to be impervious to salvia in the oral environment. One example of sealing the cover is by ultrasonic welding of the cover to the maxillary splint.

In particular, the first cover is positioned at an outer side of the maxillary splint body, such that in use the first cover mates with an inner surface of a user's cheek. Preferably, the first cover is plate-shaped. Preferably, the first cover is positioned flush with an outer surface of the maxillary splint body. Advantageously, the maxillary splint may have a smooth outer surface without any protrusions which might be inconvenient for a user. Preferably, the set of electronic components are provided at a same height level of a molar receiving pocket for receiving at least one of the upper molars of the user.

In an embodiment of the mandibular advancement device according to the invention, the first set of electronic components comprises at least one of a battery, a wireless charging coil for charging the battery, a microprocessor for processing an input of a sensor signal originating from at least one sensor and generating an output of an alert signal to an alert unit, and a data transmission component.

For example, the microprocessor may be configured to process an input of a sensor signal originating from at least one sensor, e.g. an optical sensor or a position sensor, and to generate an alert signal for the alert unit. For example, the alert signal may be generated depending on the input received from at least one of the sensor. The interconnecting conduit, in particular a flex PCB, comprises an electric circuit for communication between the microprocessor, the at least one sensor and alert unit.

In an embodiment of the mandibular advancement device according to the invention, the second set of electronic components comprises an optical sensor, in particular an optical pulse-oxygen meter for measuring an oxygen saturation of the user. In particular, the optical pulse-oxygen meter is adapted to measure an oxygen saturation in the cheek of the user.

Preferably, the cover which shields the set of electronic components comprises is at least partially transparent, in particular provided by a cover window which allows radiation through the cover, such that the optical sensor, in particular the pulse-oxymeter is enabled to particularly measure a saturation of oxygen of the user without being in contact with flesh and/or skin of the user, but while it is shielded from the flesh and/or skin of the user by said window. In particular, the cover may be integral with the optical sensor, such that the optical sensor and cover form a one piece item.

Embodiments described in relation to the first cover only may also be advantageous for the second cover.

In an embodiment of the mandibular advancement device, the second set of electronic components comprises a position sensor. Preferably, the position sensor is an accelerometer. The position sensor is configured to determine an orientation of the maxillary splint and hence an orientation of a head of a user. Preferably, the second set of electronic components is free of a battery and/or a wireless charging coil. The battery and/or wireless charging coil are preferably part of the first set of electronic components. Electronic interferences between the position sensor and/or the optical sensor on the one hand and the battery on the other hand may be prevented by spacing the battery at a distance away from the position and/or optical sensor.

In an embodiment of the mandibular advancement device, the second set of electronic components further comprises an alert unit, in particular a vibrator, more in particular a piezo element for generating a vibrational alert to a user. Preferably, the alert unit may be stacked together with other electronic components of the set, such as the optical sensor and the position sensor. Preferably, the second set of electronic components are stacked on top of each other. Preferably, the electronic components are arranged in a stack, wherein the stack successively comprises a cover, an optical sensor, a position sensor, and an alert unit seen in a direction from the cheek of a user to the tongue of a user. Preferably, the electronic components are provided in direct abutting engagement with each other. Preferably, the set of electronic components are glued together to form a solid entity.

In a further embodiment of the mandibular advancement device, the alert unit is positioned at an outer position of the stack of electronic components. The set including the alert unit is preferably installed in an abutting engagement with the compartment bottom of the compartment for receiving the set of electronic components. The compartment bottom may form a wall portion of the modular receiving pocket and may include the tooth engagement surface. The compartment bottom may be thin-walled, e.g. less than 1 mm, which allows vibrations to be transmitted directly via the thin-walled compartment bottom to a molar of an upper jaw. Providing an alert my bone conduction via the molar of the user may be preferred for not disturbing a bed partner of the user. Preferably, the user does not feel the vibrations provided by the alert unit, but only hears said vibrations.

In an embodiment of the mandibular advancement device according to the invention, the mandibular advancement a device has a closed state in which the maxillary splint abuts against the mandibular splint. The mandibular advancement device is movable, in particular rotatable, from the closed state to an open state in which the maxillary splint is moved, in particular rotated, away from the mandibular splint. Herewith, the maxillary splint is movable together with the upper jaw of the user and the mandibular splint is movable together with the lower jaw of the user. The positioning structure of the mandibular advancement device sets an advanced position of the mandibular splint with respect to the maxillary splint, and allows a movement of the mandibular advancement device to and fro the closed and open state.

In an embodiment of the mandibular advancement device, the positioning structure comprises a pair of rigid links for coupling the maxillary splint to the mandibular splint. Preferably, each link is a straight link. The links have a predetermined length which length determines the advancement of the mandibular splint with respect to the maxillary splint.

Preferably, the links of a pair have a fixed length and are configured to be interchangeable, such that a user or a physician can select and install a particular link to apply a predetermined advancement of the lower jaw. Each interchangeable link is manually releasable attached to the mandibular advancement device. Preferably, each link end is connectable to the device by a bayonet connection.

The pair of links comprises a first and second link. A first link may be positioned at a left side of the mandibular advancement device and a second link may be positioned at a right side of the mandibular advancement device. Preferably, each link is positioned outside the mandibular splint.

In a further embodiment of the positioning structure of the mandibular advancement device, each link has—seen in an anterior direction—a proximal link end which is connectable to the mandibular splint and a distal link end in which is connectable to the maxillary splint. In the closed state, each link extends aside and along the mandibular splint. Preferably, in the closed state, each link extends substantially in parallel with the mandibular splint. Preferably, each link is fully positioned below the maxillary splint body which provides space for a proper placement of a set of electronic components at the maxillary splint. In other words, each link is positioned in an imaginary horizontal plane below the maxillary splint. Herewith, the positioning structure has a very compact configuration which requires only a small volume in the user's oral cavity. This configuration of the positioning structure may strongly reduce a bulkiness of the mandibular advancement device and may further contribute to an increase of a wearing comfort.

In particular, the proximal link end is pivotally connected to the mandibular splint by a pivot projection which forms a proximal pivot point. Preferably, the pivot projection extends in a lateral direction away from the mandibular splint body end portion. Herewith, the proximal link end is attached at a same height level as a molar receiving pocket of the mandibular splint. The proximal link end is attached to the mandibular splint body aside the at least one molar receiving pocket. To obtain the parallel orientation in the closed state, the distal link end is-seen the molar receiving pocket of the maxillary splint-attached to the maxillary splint at a different height level. The maxillary splint is provided with an extension for spacing a distal pivot point at a distance below the splint body end portion. The extension is positioned at an end of the splint bridge portion. The extension is positioned at a position aside the set of electronic components. The extension extends downwardly below the maxillary splint body, such that the distal link end is pivotally connected to the maxillary splint at a distance from the maxillary splint body. Herewith, the pivot projection and extension together define an orientation of an attached link which is substantially in parallel with the mandibular splint in the closed state. Advantageously, the proximal link end is pivotally connected to the mandibular splint and the distal link end is pivotally connected to the maxillary splint, such that in use a pulling force is exerted on the pair of links. The lower molars at the lower jaw are pulled to the upper molars to obtain the advanced position of the mandibular jaw of the user. Such a pulling force allows a narrow design of each link which may further contribute to a compactness of the device.

Further, the invention relates to a method for manufacturing a mandibular advancement device.

In an embodiment of a method for manufacturing the mandibular advancement device according to the invention, the maxillary splint may be manufactured by using a 3D printing technique. Advantageously, 3D printing the maxillary splint allows a manufacturing of a splint with a thin wall thickness. Herewith, a total width and height of the maxillary splint can be limited in comparison with other production techniques. For example, by 3D printing the maxillary splint, the wall thickness of the first and second splint body end portions, may be as narrow as 2 mm. It is noted that for known conventional mandibular advancement devices, that are e.g. moulded, this wall thickness is around 6 mm. Where a conventional mandibular advancement device which requires any electronics bulges out with respect to the maxillary splint, using a 3D printing technique for the manufacturing thereof, the total width of the splint body end portions, including the electronics, may be limited to at most 6 mm, or possibly even less. For many known mandibular advancement devices, this width is at least 12 mm meaning already 6 mm for the end portion of the maxillary splint, and at least another 6 mm for to locate the electronics. Hence, by the combined effect of 3D printing the maxillary splint and providing a first set of electronics and a second set of electronics, the total width of the splint body end portions may be reduced significantly, e.g. with a factor of two. This may significantly increase the wear comfort of the user.

In an embodiment of a method for manufacturing the mandibular advancement device according to the invention, wherein the electronic conduit is to be embedded in the splint bridge portion, the maxillary splint of the mandibular advancement device is made by a 3D printing technique, the maxillary splint may be printed in a first step, wherein a passageway is formed within the splint bridge portion. The electronic conduit may thereafter be inserted and charged through said passageway in a second manufacturing step. In a subsequent step, the passageway may be closed with a sealing, to prevent any intrusion of bacteria and/or moisture into the passageway.

In an alternative embodiment of the method for manufacturing the mandibular advancement device, the first set of electronic components, the second set of electronic components, and if required the interconnecting electric conduit may be arranged in their preferred layout first, whereafter the maxillary splint is moulded around said electric components in a next manufacturing step. The electronic components may be integrated in the maxillary splint by an in-mould technique, wherein the electronic components are placed in a mould during a supply of moulding material. Compared to 3D printing of the maxillary splint this may lead to a somewhat thicker splint body end portion on the one hand, but may make it more easy to seal the electric components on the other hand.

The invention will be explained in more detail with reference to the appended drawings. The drawings show a practical embodiment according to the invention, which may not be interpreted as limiting the scope of the invention. Specific features may also be considered apart from the shown embodiment and may be taken into account in a broader context as a delimiting feature, not only for the shown embodiment but as a common feature for all embodiments falling within the scope of the appended claims, in which:

Figure 1:
FIG. 1 shows in a schematic view a person whoc is laying in a supine position and who is a user of a mandibular advancement device.

Identical reference signs are used in the drawings to indicate identical or functionally similar components.

To facilitate comprehension of the description and of the claims the words front side FS, left and right side LS, RS, bottom side BS, below, aside/lateral, anterior/forward direction, vertical, horizontal, longitudinal, cross-sectional—with reference to human anatomy, like upper jaw, lower jaw, left and right cheek—are used in a non-limiting way.

FIG. 1 shows in a schematic view a person P who is lying on his back, a supine position, and who is wearing a mandibular advancement device 1. Such a mandibular advancement device is a mouthpiece which is to be worn in the oral cavity of the user. The device is arranged to be used in treating sleep disorders, like snoring and sleep apnea. The device is also known as a mandibular advancement splint, sleep apnea oral appliance, oral airway dilator or sleep apnea mouthguard.

Figure 2:
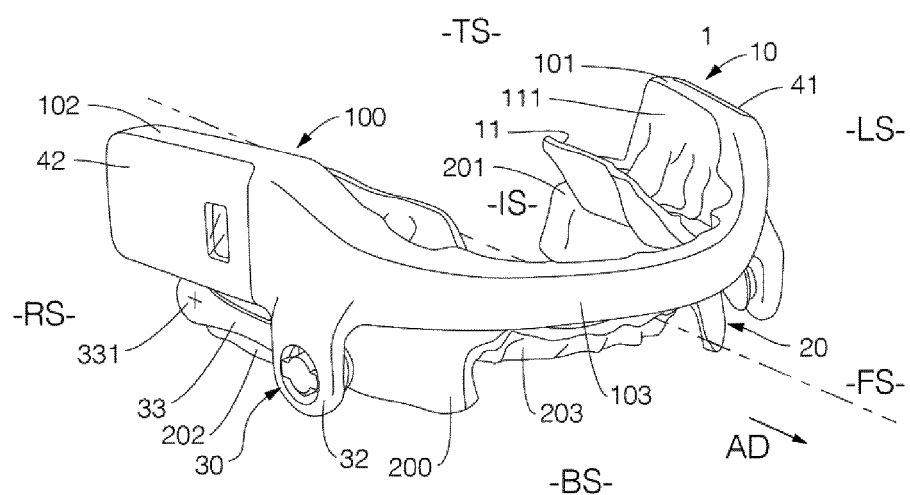
FIG. 2 shows the mandibular advancement device in a right-sided perspective view, wherein an electronics module includes two separate units which are spaced apart from each other and positioned at respectively a first and second maxillary splint body end portion.

As shown in FIG. 2, the mandibular advancement device 1 comprises two parts which are coupled together. The mandibular advancement device 1 has a maxillary splint 10 which is adapted to be fitted to an upper jaw of the user. The maxillary splint 10 is adapted to be fitted on a maxillary row of teeth, such that the maxillary splint fits tightly to the upper jaw of the user. The maxillary splint 10 comprises at least one molar receiving pocket 11 for tightly receiving a molar of the maxillary row of teeth. The molar receiving pocket 11 includes a tooth engagement surface 111 to engage with at least one tooth.

The maxillary splint 10 comprises a U-shaped maxillary splint body 100. The maxillary splint body 100 is configured to extend along a maxillary row of teeth, a front portion is configured to extend along a front side of front teeth, a left and right end portion are configured to extend along a row of molars of the upper jaw. The left and right end portions are configured to fit tightly onto at least one molar of the upper jaw.

The maxillary splint body 100 has a first splint body end portion 101 at a left side LS which forms a first U-leg, and a second splint body end portion 102 at a right side RS which forms a second U-leg. The left side LS of the device corresponds with a left cheek of the user and the right side RS of the device corresponds with a right cheek of the user.

A splint bridge portion 103 bridges in between the first and second splint body end portions. The splint bridge portion 103 interconnects the first and second splint body end portions. In use, the splint bridge portion 103 extends along and in front of a row of front teeth at the upper jaw of the user. The splint a bridge portion 103 extends in between the corner teeth of the user. In use, the splint bridge portion 103 is situated in between a row of front teeth and an upper lip of the user.

Further, the mandibular advancement device 1 comprises a mandibular splint 20. The mandibular splint 20 is adapted to be fitted on a mandibular row of teeth, such that the mandibular splint fits tightly to the lower jaw of the user. Also, the mandibular splint 20 is U-shaped.

The mandibular splint 20 comprises a U-shaped mandibular splint body 200. The mandibular splint body is configured to extend along a mandibular row of teeth. The mandibular splint body 200 is configured to extend along a mandibular row of teeth. A front portion 203 is configured to extend along a rear side of a mandibular row of front teeth, a left and right end portion 201, 202 are configured to extend along a row of molars of the lower jaw. The left and right end portions 201, 202 each comprises a molar receiving pocket which are configured to fit tightly onto at least one molar of the lower jaw.

The maxillary and mandibular splint are coupled to each other by a positioning structure 30. The positioning structure 30 is arranged for setting the mandibular splint 20 with respect to the maxillary splint 10 in an advanced position. The positioning structure 30 is arranged to adjust the position of the mandibular splint in the anterior direction AD (illustrated by an arrow) with respect to the maxillary splint.

An advanced position means that the mandibular splint 20 is slightly forwardly positioned relative to the maxillary splint, such that in use the lower jaw is moved slightly forward with respect to a natural position of the upper and lower jaw of the user, such that a soft tissue and muscles of the upper away of the user are somewhat tightened to prevent an obstruction of the airway during a sleep period. The tightening created by the mandibular advancement device may also prevent a tissue of the upper airway to vibrate when air passes along which is a common cause of snoring.

The mandibular advancement device 1 further comprises an electronics module 40. The electronics module 40 comprises a plurality of electronic components which are arranged in an electronic circuit. According to the invention, the electronic components are subdivided over at least two sets of electronic components which are spaced apart from each other and positioned at the splint body end portions of the maxillary splint. The set of electronic components are electronically interconnected.

Figure 3:
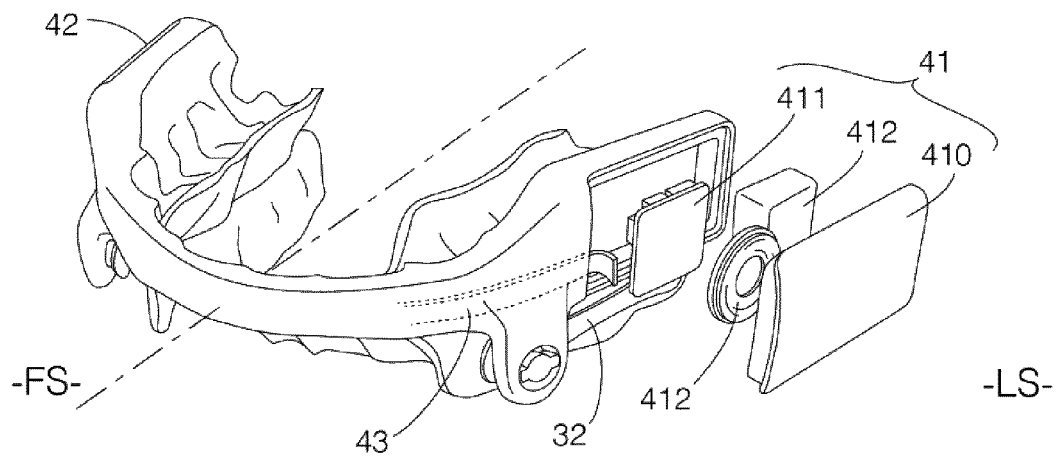
FIG. 3 shows the mandibular advancement device in a left-sided perspective view in which a first set of electronic components is illustrated in an exploded view.
Figure 4:
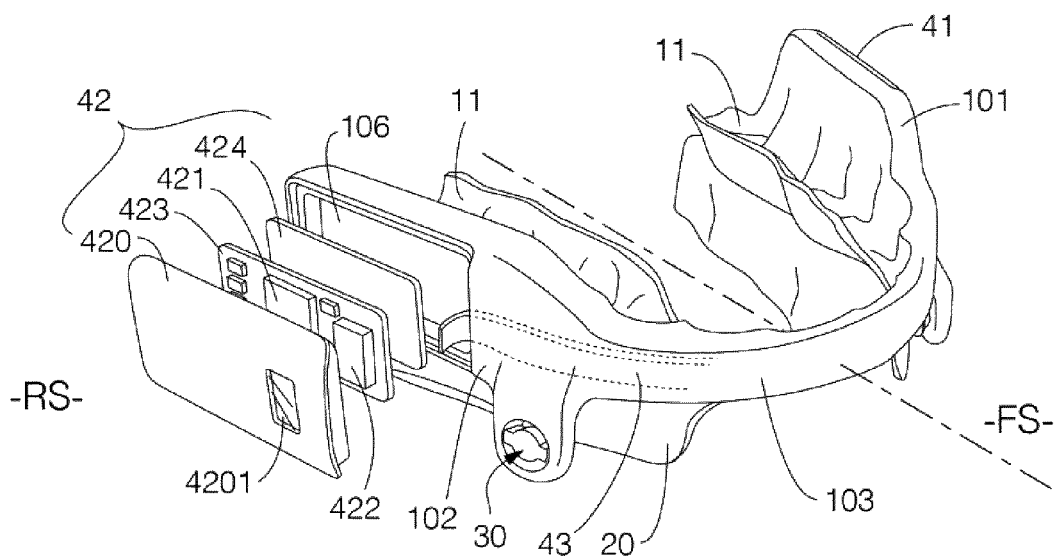
FIG. 4 shows the mandibular advancement device in a right-sided perspective view, in which a second set of electronic components is illustrated in an exploded view.

As further shown in FIGS. 3 and 4, the electronics module 40 comprises a first set of electronic components 41 and a second set of electronic components 42. The first set of electronic components 41 is positioned at the first splint body end portion 101. The second set of electronic components 42 is positioned at the second splint body end portion 102. Each set of electronic components 41, 42 is positioned as an outer side of the maxillary splint 10. Herewith, in use, the sets 41, 42 faces an inner surface of the user's cheek when the mandibular advancement device is placed inside the user's oral cavity.

An electronic conduit, a flex circuit 43, extends along the bridge portion 103 and interconnects the first and second set of electronic components 41, 42 at the end portions 101, 102 of the maxillary splint 10. As shown in FIGS. 3 and 4, the flex circuit 43 is embedded in the bridge portion 103. The flex circuit 43 is an elongated circuit which extends along the bridge portion 103. A first end of the flex circuit 43 is electronically connected to the first set of electrical components 41 and a second opposite end is connected to the second set of electrical components 42.

As illustrated in FIGS. 3 and 4, the first and second set of electronic components 41, 42 are received in a compartment 105 of the splint body end portion 101, 102. Each compartment 105 has a rectangular shape. Each compartment 105 is formed by a lateral deepening in the splint body end portion. The first and second set of electronic components 41, 42 are positioned at a same height level as the molar receiving pocket 11. The compartment has a compartment bottom 106 which forms a sidewall of the molar receiving pocket 11. The compartment 105 has a compartment wall 107 for circumventing a received set of electronic components.

As illustrated in FIGS. 3 and 4, the first and second set of electronic components 41, 42 which each comprises a cover 410, 420. One of the covers 420 is at least partially transparent. The cover 420 has a cover window 4201 to allow measurements by an optical sensor, like a pulse-oximeter sensor.

Each cover is plate-shaped. Each cover has a rectangular outer contour. The cover fits on top of the compartment 105. The cover fits tightly onto the compartment wall 107 for hermetically sealing the electronic components in the compartment. An outer surface of the cover 41, 42 is positioned flush with an outer surface of the maxillary splint body 100 to improve comfort in wearing the device in the oral cavity.

The first set of electronic components 41 is positioned at a left side LS of the maxillary splint and comprises a microprocessor 411 for processing an input of a sensor signal originating from at least one sensor and generating an output of an alert signal to an alert unit, a battery 412, a wireless charging coil 413 for charging the battery. Thus, the first set of electronic components 41 is a set of control components.

The second set of electronic components 42 is positioned at a right side RS of the maxillary splint and comprises a position sensor 421 which is here an accelerometer, an optical sensor 422 which is here a pulse oximeter, and an alert unit 424 which is here a piezo element. Thus, the second set of electronic components 42 is a set of sensors and actuators.

The second set of electronic components is formed by a stack of components. The cover 420 is positioned on top of the stack, and the alert unit is positioned at the bottom of the stack. A circuit board is provided which supports at least one sensor. The circuit board carries the position and optical sensor 421, 422. The circuit board is positioned behind the cover, such that the optical sensor 422 is positioned behind the cover window 4201. The alert unit 424, the circuit board, and the cover 420 are glued together to form a unit is a one piece item.

The alert unit 424 is positioned in abutting engagement with the compartment bottom 106. The compartment bottom 106 is a thin-walled bottom, preferably at most 0.5 mm, which compartment bottom 106 forms a sidewall of the molar receiving pocket 11, such that vibrations are effectively transmitted through the thin-walled bottom to a tooth of the upper jaw.

Further, as illustrated in FIG. 2, the positioning structure 30 of the mandibular advancement device 1 is configured in a beneficial manner.

The positioning structure 30 includes a pair of links 31. Each link is positioned at a lateral outer side of the device 1. The pair of links 31 includes a left link 32 and a right link 33. Each link has a fixed length. Each link is interchangeable by another link, which enables a user to adjust an advanced position of the mandibular splint with respect to the maxillary splint.

Each link 32, 33 has a proximal link end 331 which is connectable to be mandibular splint and a distal link end 332 which is connectable to the maxillary splint 10. The proximal link end 331 is connectable to the end portion of the mandibular splint by a pivot projection which extends laterally away from the end portion. The distal link end 332 is connectable to the maxillary end portion by an extension 32 which extends downwardly away from the maxillary splint body. The extension 32 spaces a pivot point of the distal link end 332 below the set of electronic components 41, 42, such that the link extends in parallel with the mandibular splint, when they device 1 is in a closed state. In the closed state of the device 1, the maxillary splint is resting on top of the mandibular splint. The closed state of the device 1 corresponds with a situation in which the user has its mouth in a closed position.

Although the present invention has been described in detail, it will be apparent to those skilled in the art that various changes and modifications can be made without departing from the scope of the invention as hereinafter claimed. It is intended that all such changes and modifications be encompassed within the scope of the present disclosure and claims.

Thus, the invention provides a mandibular advancement device to adjust a lower jaw in an advanced position with respect to an upper jaw of a user. The device comprises a maxillary splint with a first and second splint body end portion and a splint bridge portion and further a mandibular splint which is coupled to the maxillary splint by a positioning structure. The device comprises an electronics module which is subdivided into a first set of electronic components which is positioned at the first splint body end portion and a second set of electronic components which is positioned at the second splint body end portion. The spaced sets at both ends of the maxillary splint are electronically interconnected to form the electronics module. Herewith, the device has a smooth and compact configuration which is convenient to wear for several hours during a sleep therapy.

LIST OF REFERENCE SIGNS

P user
OC oral cavity
LS left side
RS right side
OS outer side
IS inner side
TS top side
BS bottom side
FS front side
AD anterior direction
1 mandibular advancement device
10 maxillary splint
100 maxillary splint body
101 first splint body end portion
102 second splint body end portion
103 splint bridge portion
105 compartment
106 compartment bottom
107 compartment wall
11 molar receiving pocket
111 tooth engagement surface
20 mandibular splint
200 mandibular splint body
201 mandibular left end portion
202 mandibular right end portion
203 mandibular front portion
30 positioning structure
31 pair of links
32 left link
33 right link
331 proximal link end
332 distal link end
32 extension
33 pivot projection
40 electronics module
41 first set of electronic components
42 second set of electronic components
43 interconnecting conduit; flex circuit
410 first cover
420 second cover
4201 cover window
411 microprocessor
412 battery
413 inductive charging component
414 wireless input-output component
421 accelerometer
422 pulse oxymeter
423 sensor circuit board
424 alert unit, vibrator

The invention claimed is:
1. A mandibular advancement device for placement in a user's oral cavity to set a lower jaw in an advanced position with respect to an upper jaw of the user, which mandibular advancement device comprises:

a maxillary splint adapted to be fitted on a maxillary row of teeth, which maxillary splint has a tooth engagement surface to engage with at least one tooth, wherein the maxillary splint comprises a U-shaped maxillary splint body having a first splint body end portion forming a first U-leg, a second splint body end portion forming a second U-leg and a splint bridge portion which extends in between said first and second splint body end portions;

a mandibular splint adapted to be fitted on a mandibular row of teeth;

a positioning structure for positioning the mandibular splint in an advanced position with respect to the maxillary splint, wherein the mandibular advancement device further comprises an electronics module comprising:

a first set of electronic components which is positioned at the first splint body end portion; and a second set of electronic components which is positioned at the second splint body end portion, wherein the second splint body end portion includes a compartment and a cover formed separately from the compartment, the compartment having a bottom and a wall extending from the bottom, wherein the bottom has a first surface and a second surface opposite the first surface, wherein the second surface is part of the tooth engagement surface, wherein the second set of electronic components comprises a stack of components including a circuit board having at least one sensor and an alert unit, wherein the cover is positioned on a top of the stack, the alert unit is positioned on a bottom of the stack, and the circuit board is positioned between the cover and the alert unit, wherein the cover, the circuit board and the alert unit are adhered together to form a unit, and wherein the stack is received within the compartment such that the cover forms a hermetic seal with the wall of the compartment and the alert unit is in abutting engagement with the first surface, wherein the first and a second set of electronic components are electronically interconnected.

2. The mandibular advancement device according to claim 1, wherein each set of electronic components is positioned at an outer side of the respective splint body end portion, such that each set of electronic components faces an inner surface of a user's cheek when the mandibular advancement device is placed inside a user's oral cavity.

3. The mandibular advancement device according to claim 1, wherein at least one of the first and second set of electronic components is positioned at a same height level as a molar receiving pocket for receiving a molar of a user.

4. The mandibular advancement device according to claim 1, wherein the first and second set of electronic components are electronically interconnected by an electronic conduit embedded in the splint bridge portion.

5. The mandibular advancement device according to claim 1, wherein the cover is positioned flush with an outer surface of the maxillary splint body.

6. The mandibular advancement device according to claim 1, wherein the first set of electronic components comprises at least one of a battery, a wireless charging coil for charging the battery, a microprocessor for processing an input of a sensor signal originating from the at least one sensor and generating an output of an alert signal to the alert unit, and a data transmission component.

7. The mandibular advancement device according to claim 1, wherein the at least one sensor includes a pulse-oximeter for measuring an oxygen saturation, and wherein the cover comprises a cover window to allow a measurement by the optical sensor through the cover window.

8. The mandibular advancement device according to claim 1, wherein the at least one sensor includes a position sensor to determine orientation of the maxillary splint.

9. The mandibular advancement device according to claim 1, wherein the positioning structure comprises a pair of straight links, wherein each straight link is, as seen in an anterior direction, at a proximal link end pivotally attached to the mandibular splint and at a distal link end pivotally attached to the maxillary splint, wherein in a closed state of the mandibular advancement device, each straight link extends in parallel with the mandibular splint.

10. A method for manufacturing a mandibular advancement device according to claim 1, wherein the method comprises the following steps:

3D printing a maxillary splint comprising a U-shape maxillary splint body with a splint bridge portion in between a first and second splint body end portion, wherein a passageway is formed within the splint bridge portion, wherein the maxillary splint has a tooth engagement surface to engage with at least one tooth, wherein the second splint body end portion includes a compartment having a bottom and a wall extending from the bottom, wherein the bottom has a first surface and a second surface opposite the first surface, wherein the second surface is part of the tooth engagement surface;

providing an electronic conduit through the passageway of the splint bridge portion, wherein the electronic conduit has a first and second end for respectively connecting a first and second set of electronic components, providing the second set of electronic components as a stack of components including a circuit board having at least one sensor and an alert unit, wherein a cover formed separately from the compartment is positioned on a top of the stack, the alert unit is positioned on a bottom of the stack, and the circuit board is positioned between the cover and the alert unit, wherein the cover, the circuit board and the alert unit are adhered together to form a unit, providing the stack within the compartment such that the cover forms a hermetic seal with the wall of the compartment and the alert unit is in abutting engagement with the first surface;

electronically connecting the first and second set of electronic components to both ends of the electronic conduit.

\* \* \* \* \*